US012363064B2

United States Patent
Jain et al.

(10) Patent No.: US 12,363,064 B2
(45) Date of Patent: *Jul. 15, 2025

(54) ZERO-TRUST DNS AND FQDN BASED TRAFFIC ACQUISITION USING SYNTHETIC IP

(71) Applicant: Microsoft Technology Licensing, LLC, Redmond, WA (US)

(72) Inventors: Ashish Jain, Bellevue, WA (US); Mordhai Gendelman, Ramat-Gan (IL); Or Moran, Rishon Le Zion (IL); Omer Kattan, Tel Aviv (IL); Yair Tor, Sammamish, WA (US); Ronen Shmuel Goldsmith, Raanana (IL); Liraz Barak, Hod-Hasharon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,446

(22) Filed: Jan. 18, 2024

(65) Prior Publication Data

US 2024/0250929 A1 Jul. 25, 2024

Related U.S. Application Data

(63) Continuation of application No. 18/099,417, filed on Jan. 20, 2023, now Pat. No. 11,943,195.

(51) Int. Cl.
*H04L 61/2592* (2022.01)
*H04L 61/4511* (2022.01)

(52) U.S. Cl.
CPC ...... *H04L 61/2592* (2013.01); *H04L 61/4511* (2022.05)

(58) Field of Classification Search
CPC .......... H04L 61/2592; H04L 61/4511
See application file for complete search history.

(56) References Cited

U.S. PATENT DOCUMENTS 9,094,445 B2 * 7/2015 Moore ............... H04L 63/14
9,954,902 B1 * 4/2018 Sethi ............... H04L 61/5007
(Continued)

FOREIGN PATENT DOCUMENTS

EP 3453152 B1 7/2020

OTHER PUBLICATIONS

U.S. Appl. No. 18/099,417, filed Jan. 20, 2023.
(Continued)

*Primary Examiner* — Jimmy H Tran
(74) *Attorney, Agent, or Firm* — Workman Nydegger (57) ABSTRACT

A computing system is configured to perform zero-trust domain name resolution. The computing system includes applications coupled to a zero-trust client. The zero-trust client is configured to receive requests for IP addresses corresponding to endpoint identifiers for internet connected endpoints. The zero-trust client includes a synthetic DNS service configured to identify synthetic IP addresses for the endpoint identifiers. The zero-trust client provides the synthetic IP addresses for the endpoint identifiers to the applications. The zero-trust client sends data traffic from the applications to a zero-trust service with the synthetic IP addresses where corresponding synthetic IP addresses are correlated to the endpoint identifiers at the zero-trust service.

20 Claims, 6 Drawing Sheets

(56) References Cited

U.S. PATENT DOCUMENTS

| | | | |
|---|---|---|---|
| 11,057,351 B1* | 7/2021 | Simanel | H04L 67/146 |
| 11,722,519 B1* | 8/2023 | Agrawal | H04L 63/1466 |
| | | | 726/23 |
| 11,863,528 B1* | 1/2024 | Chung | H04L 69/22 |
| 2002/0069278 A1* | 6/2002 | Forslow | H04L 63/0263 |
| | | | 709/225 |
| 2003/0074472 A1* | 4/2003 | Lucco | H04L 61/4552 |
| | | | 709/245 |
| 2004/0249973 A1* | 12/2004 | Alkhatib | H04L 67/563 |
| | | | 709/245 |
| 2004/0249974 A1* | 12/2004 | Alkhatib | H04L 61/2503 |
| | | | 709/245 |
| 2009/0059936 A1 | 3/2009 | Van De Poel | |
| 2012/0324113 A1* | 12/2012 | Prince | H04L 61/4511 |
| | | | 709/226 |
| 2014/0089661 A1* | 3/2014 | Mahadik | H04L 9/0643 |
| | | | 713/162 |
| 2016/0197830 A1* | 7/2016 | Ulevitch | H04L 63/0281 |
| | | | 370/392 |
| 2016/0218978 A1 | 7/2016 | Lapidous | |
| 2016/0380975 A1* | 12/2016 | Reddy | H04L 61/4511 |
| | | | 726/12 |
| 2017/0171232 A1* | 6/2017 | Graham-Cumming | H04L 61/5076 |
| 2018/0041468 A1* | 2/2018 | Miller | G06F 9/45558 |
| 2019/0007366 A1* | 1/2019 | Voegele | H04L 12/4633 |
| 2019/0141015 A1* | 5/2019 | Nellen | H04L 63/0272 |
| 2019/0158605 A1* | 5/2019 | Markuze | H04L 69/163 |
| 2020/0053072 A1* | 2/2020 | Glozman | H04W 12/08 |
| 2020/0137093 A1* | 4/2020 | Janakiraman | H04L 63/0263 |
| 2020/0162431 A1* | 5/2020 | Goldschlag | H04L 9/3218 |
| 2020/0322309 A1* | 10/2020 | Fischbach | H04L 61/2514 |
| 2020/0358738 A1 | 11/2020 | Mircescu | |
| 2021/0044623 A1* | 2/2021 | Bosch | G06F 21/575 |
| 2021/0067489 A1* | 3/2021 | Jayawardena | H04L 67/1097 |
| 2021/0168125 A1* | 6/2021 | Vemulpali | H04L 9/3236 |
| 2021/0234860 A1* | 7/2021 | Bansal | H04W 12/37 |
| 2021/0273913 A1* | 9/2021 | Bosch | H04L 63/0815 |
| 2021/0314301 A1* | 10/2021 | Chanak | H04L 63/0823 |
| 2021/0336931 A1* | 10/2021 | Lutz | H04L 12/4641 |
| 2021/0336959 A1* | 10/2021 | Shah | H04L 63/0281 |
| 2021/0377222 A1* | 12/2021 | Sharma | H04L 63/0823 |
| 2021/0392111 A1* | 12/2021 | Sole | G06F 21/552 |
| 2022/0029965 A1* | 1/2022 | Chanak | H04L 67/10 |
| 2022/0029988 A1* | 1/2022 | Levin | H04L 63/0823 |
| 2022/0060449 A1* | 2/2022 | Head, Jr. | H04L 63/029 |
| 2022/0210173 A1* | 6/2022 | Katmor | H04L 63/1416 |
| 2022/0224703 A1* | 7/2022 | Devarajan | H04L 63/0428 |
| 2022/0239679 A1* | 7/2022 | Sircar | G06F 18/23213 |
| 2022/0353244 A1* | 11/2022 | Kahn | H04L 67/12 |
| 2022/0360565 A1* | 11/2022 | Shribman | H04L 67/56 |
| 2022/0408255 A1* | 12/2022 | Howe | H04W 12/062 |
| 2023/0006968 A1* | 1/2023 | Catz | H04L 63/0209 |
| 2023/0012224 A1* | 1/2023 | Kumar | H04L 63/10 |
| 2023/0072378 A1* | 3/2023 | Chhabra | H04L 41/12 |
| 2023/0079444 A1* | 3/2023 | Parla | H04L 12/4633 |
| | | | 726/11 |
| 2023/0096469 A1* | 3/2023 | John | H04W 36/12 |
| | | | 370/392 |
| 2023/0104568 A1* | 4/2023 | Miriyala | H04L 41/0813 |
| | | | 718/104 |
| 2023/0121834 A1* | 4/2023 | Kaimal | H04L 43/0811 |
| | | | 713/168 |
| 2023/0122630 A1* | 4/2023 | Balaiah | H04L 12/4641 |
| | | | 709/224 |
| 2023/0123781 A1* | 4/2023 | Kaimal | H04L 67/34 |
| | | | 726/12 |
| 2023/0126355 A1* | 4/2023 | Anani | H04L 63/0281 |
| | | | 726/27 |
| 2023/0133809 A1* | 5/2023 | Ayyadevara | H04L 67/563 |
| | | | 709/225 |
| 2023/0161832 A1* | 5/2023 | Shribman | H04L 69/40 |
| | | | 709/219 |
| 2023/0246816 A1* | 8/2023 | Heilman | H04L 9/3247 |
| | | | 713/171 |
| 2023/0247003 A1* | 8/2023 | Chanak | H04L 9/3226 |
| | | | 726/1 |
| 2023/0254318 A1* | 8/2023 | Hu | G06F 21/604 |
| | | | 726/1 |
| 2023/0308415 A1* | 9/2023 | Wondra | H04L 63/102 |
| 2023/0421478 A1* | 12/2023 | Chhabra | H04L 63/0272 |
| 2024/0064138 A1* | 2/2024 | Jain | H04W 12/068 |
| 2024/0064147 A1* | 2/2024 | Jain | H04L 63/20 |
| 2024/0106861 A1* | 3/2024 | Ahn | H04L 63/0435 |
| 2024/0129321 A1* | 4/2024 | Howe | H04L 63/20 |
| 2025/0007835 A1* | 1/2025 | Chhabra | H04L 63/1408 |

OTHER PUBLICATIONS

International Search Report and Written Opinion received for PCT Application No. PCT/US2023/083716, mailed on Mar. 27, 2024, 15 pages.

* cited by examiner

- 510: Identifying a synthetic IP address for an endpoint identifier for an internet connected endpoint at a zero trust client on a local machine, the synthetic IP address being an IP address that is different from an IP address that is assigned to the endpoint identifier by a trusted DNS

- 520: In response to the request for an IP address corresponding to the endpoint identifier providing the synthetic IP address for the endpoint identifier to the application

- 530: Receiving data traffic at the zero-trust client, from the application directed to the internet connected endpoint the data traffic being associated with the synthetic IP address by the application

- 540: Sending the data traffic to a zero-trust service with the synthetic IP address

- 550: Sending the endpoint identifier to the zero-trust service in a fashion that allows the synthetic IP address to be correlated to the endpoint identifier at the zero-trust service

```
610 — Receiving data traffic and a synthetic IP address from a zero-trust client at a local machine, the synthetic IP address being an IP address that is different from an IP address that is assigned to an endpoint identifier by a trusted DNS 620 — receiving the endpoint identifier for an internet connected endpoint in a fashion that allows the synthetic IP address to be correlated to the endpoint identifier 630 — Obtaining a trusted IP address for the endpoint identifier 640 — Using the trusted IP address, sending the data traffic to the internet connected endpoint 650 — Receiving response data traffic from the internet connected endpoint 660 — Providing the response data traffic to the local machine with the response data traffic correlated to the synthetic IP address
```

*Figure 6*

ZERO-TRUST DNS AND FQDN BASED TRAFFIC ACQUISITION USING SYNTHETIC IP

CROSS-REFERENCE TO RELATED APPLICATIONS

This application is a continuation of U.S. patent application Ser. No. 18/099,417 filed on Jan. 20, 2023, entitled "ZERO-TRUST DNS AND FQDN BASED TRAFFIC ACQUISITION USING SYNTHETIC IP," which application is expressly incorporated herein by reference in its entirety.

BACKGROUND

Background and Relevant Art

Large employee workforces work remotely. Employees access various local and remote (e.g., cloud) company resources directly from the Internet, through a corporate network (e.g., via a virtual private network (VPN) connection), or from computing devices within the corporate network. Remote company resources may include services and applications available through Infrastructure as a Service (IaaS), platform as a service (PaaS), business software as a service (Saas), Security as a service (SECaaS) or consumer SaaS. Large numbers of users accessing cloud resources may strain network capacity and security stamps. Employees may access company resources in branch offices, for example, via a wide area network (WAN) connecting corporate headquarters to branch offices, which may allow compromised users/devices (e.g., attackers) to move laterally through corporate networks.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

A computing system is configured to perform zero-trust domain name resolution. The computing system includes one or more applications coupled to a zero-trust client. The zero-trust client is configured to receive requests for IP addresses corresponding to endpoint identifiers for internet connected endpoints. The zero-trust client includes a synthetic DNS service configured to identify synthetic IP addresses for the endpoint identifiers. The synthetic IP addresses are IP addresses that are different from corresponding IP addresses assigned to the endpoint identifiers by a trusted DNS service configured to provide globally valid IP addresses. The zero-trust client provides the synthetic IP addresses for the endpoint identifiers to the applications. The zero-trust client sends data traffic from the applications to a zero-trust service with the synthetic IP addresses and sends corresponding endpoint identifiers to the zero-trust service where synthetic IP addresses are correlated to the endpoint identifiers at the zero-trust service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Large employee workforces work remotely. Employees access various local and remote (e.g., cloud) company resources directly from the Internet, through a corporate network (e.g., via a virtual private network (VPN) connection), or from computing devices within the corporate network. Remote company resources may be available via internet connected endpoints, and include services and applications available through Infrastructure as a Service (IaaS), platform as a service (PaaS), business software as a service (Saas), Security as a service (SECaaS), or consumer SaaS. Large numbers of users accessing cloud resources may strain network capacity and security stamps. Employees may access company resources in branch offices, for example, via a wide area network (WAN) connecting corporate headquarters to branch offices, which may allow compromised users/devices (e.g., attackers) to move laterally through corporate networks.

Company network IT (information technology) administrators may be unable to monitor viruses and malware when employees access the Internet from outside a company network. Admin may be unable to determine compromised employee computing devices that may be used to access company resources. A compromised computing device may be used to get into company headquarters and expand an attack to other resources in the network, e.g., via e-mail servers, financial applications, servers hosting the IP of the company, etc.

A public service edge, such as a secure access service edge (SASE), may be implemented to improve security for local and remote access to public and private resources. A SASE may be implemented as a set of security services enabling network access. A SASE may be used to provide Network as a Service (NaaS) and/or SaaS for a managed cloud service. A SASE security layer may broker connectivity to one or more resources (e.g., IaaS/PaaS such as Microsoft Azure® or Amazon Web Services (AWS), business SaaS applications such as Office 365®, consumer SaaS applications such as Facebook®), regardless whether the access is by remote workers, remote operations (e.g., from branch offices), or access from within a company network.

A SASE may be implemented with zero-trust network access (ZTNA). ZTNA enables users to securely access private resources when users are working off-premises (e.g., remote). On-premises users accessing the private resources may be provided with high performance access and the same security posture as off-premises users. ZTNA enables secure private access by providing application segmentation. Application segmentation provides for protection against attacks due to lateral movement and provides for per-application policies based on identity. In an example implementation of zero-trust based access from users to private applications, user access granularity may be provided at the level of an endpoint represented by an internet protocol (IP) address or a fully qualified domain name (FQDN) port pair. ZTNA may be less expensive, easier to manage, scalable with high performance, for example, compared to on premises infrastructure providing a local proxy to authenticate and route traffic.

In comparison, a VPN may provide direct access to a private network while ZTNA may broker connections more securely to specific private applications in a private network. ZTNA may be implemented with several principles. For example, ZTNA may be implemented to provide a user with the least privilege. In an example, a user may attempt to connect to an application. ZTNA may connect the user (e.g., if authenticated and authorized) to the application, rather than to an entire network. ZTNA may be implemented with explicit verification to an application, a network, etc., implying or assuming no (zero) trust of a user. ZTNA may be implemented with an assumption that the access is a breach or attack that must be contained. For example, an employee's computing device (e.g., machine) may get hacked or otherwise attacked. The attacker may use the machine to move into the company network. Accordingly, under an assumption that an access is an attack, access may be limited or restricted. By analogy, a key may be provided to access a single room, rather than an entire floor or building. ZTNA may be implemented to assume that a key to a room may be used on another room mistakenly or purposefully, blocking such usage.

ZTNA may be implemented with one or more zero-trust services and zero-trust clients. Security policies to access resources (e.g., applications, network) may be set on a security server (e.g., zero-trust service) providing a security service (e.g., a security engine). A ZTNA security service/ engine may have a managed client layer that provides network security and access based on security policies. Security policies may indicate, for example, identity based access to private networks and applications, private application discovery, allowed traffic (e.g., what kind of traffic should go through a managed client layer for a customer's resources), etc. A managed client layer may implement default or customer-specified security policies. A managed client layer may provide threat intelligence, perform deep packet inspection DPS), traffic filtering, transport layer security (TLS) termination and inspection, cloud access security (e.g., data loss/information protection), a world wide web application firewall, and so on. A managed client layer may be implemented as a cloud service providing NaaS and Saas to one or more customers, which may be individuals, businesses, government entities, etc.

Security policies for access/connection to private networks and/or applications may be managed (e.g., through a user interface provided by a zero-trust service) by administrators (admins) for one or more resources accessed through the managed client layer. For example, an admin for company A may set security policy for access to the resources of company A through the managed client layer, an admin for company B may set security policy for access to the resources of company B through the managed client layer, and so on for access to resources owned, leased, etc. by customers.

A customer's private network may be a combination of multiple networks. A customer's private network may have applications on premises and/or applications in the cloud. Some applications may be in one or more clouds (e.g., with different service operators, such as Microsoft, Google and Amazon).

For example, a managed client layer may, based on respective security policies, control access/connection to private networks and/or applications on one or more clouds (e.g., Microsoft Azure, Amazon Web Services (AWS), Google Cloud) and/or one or more private on-premises (e.g., corporate) networks and/or applications (e.g., Web applications, remote server authentication access, such as remote desktop protocol (RDP) or secure shell (SSH) applications, transfer protocols, such as server message block (SMB) or file transfer protocol (FTP) applications, enterprise applications such as Systems, Applications and Products (SAP) or PeopleSoft applications, printing, etc.).

A managed client layer may operate at the edge of a cloud service, e.g., wherever the cloud service may be accessible. The managed client layer may include one or more security engines, data traffic filtering, application of security policies to allowable traffic, etc. One or more security engines running in the managed client layer may enforce security policies, such as user authentication and user authorization for access to resources, traffic filtering, traffic routing, etc. Traffic from authenticated and authorized users and/or computing devices may be provided to a private network and/or application after the traffic is cleared.

A connection may be established between the managed client layer and a managed service (e.g., an application) that a user/computing device is permitted to access. For example, connectors or agents may create an outbound connection from an application to the managed client layer. Connectors may be deployed in various networks with applications users can access through the managed client layer. Private access may piggyback on the outbound connection. For example, a flow may be established in the outbound connection for each application the user is authorized to and does access. A flow may encapsulate traffic in a tunnel. A connection may have multiple flows. Each flow may limit access to a respective resource (e.g., controlled access similar to a key limiting access to a specific room rather than a key to all rooms in an entire floor or building). Connectors may forward incoming traffic to intended applications.

User computing devices may execute a client application. The client application may transform user computing devices into managed clients, e.g., for access to private resources, such as those of an employer. A user device may be referred to as a zero-trust client. A zero-trust client application running on a computing device may receive security policies from a zero-trust service. A zero-trust client may route traffic from a computing device to the managed client layer (e.g., in a cloud service) based on the security policies. A security policy may indicate, for example, where the zero-trust client should route traffic for an attempt to use a private application or network. A security policy may indicate that a user and/or a device must first authenticate, e.g., by entering credentials for analysis and approval by the managed client layer. In an example, conditional access to managed services (e.g., networks, applications) based on security policies in a managed client layer may be implemented by Microsoft Azure Active Directory (AAD).

A connection between a zero-trust client and the managed client layer (e.g., at a cloud computing edge) may be established for authenticated and authorized users/computing devices. A flow may be established in the connection for each network and/or application the user accesses. A connection may have multiple flows. Each flow may limit access to a respective resource (e.g., controlled access similar to a key limiting access to a specific room rather than a key to all rooms in an entire floor or building).

Previously, ZTNA required a dedicated DNS server proxy to ensure security when attempting to access internet connected endpoints. Embodiments illustrated herein implement an improved zero-trust client and improved zero-trust server that allow the zero-trust client to create a synthetic IP address that can be used by the zero-trust client and the zero-trust server to route data to internet connected endpoints.

Figure 1:
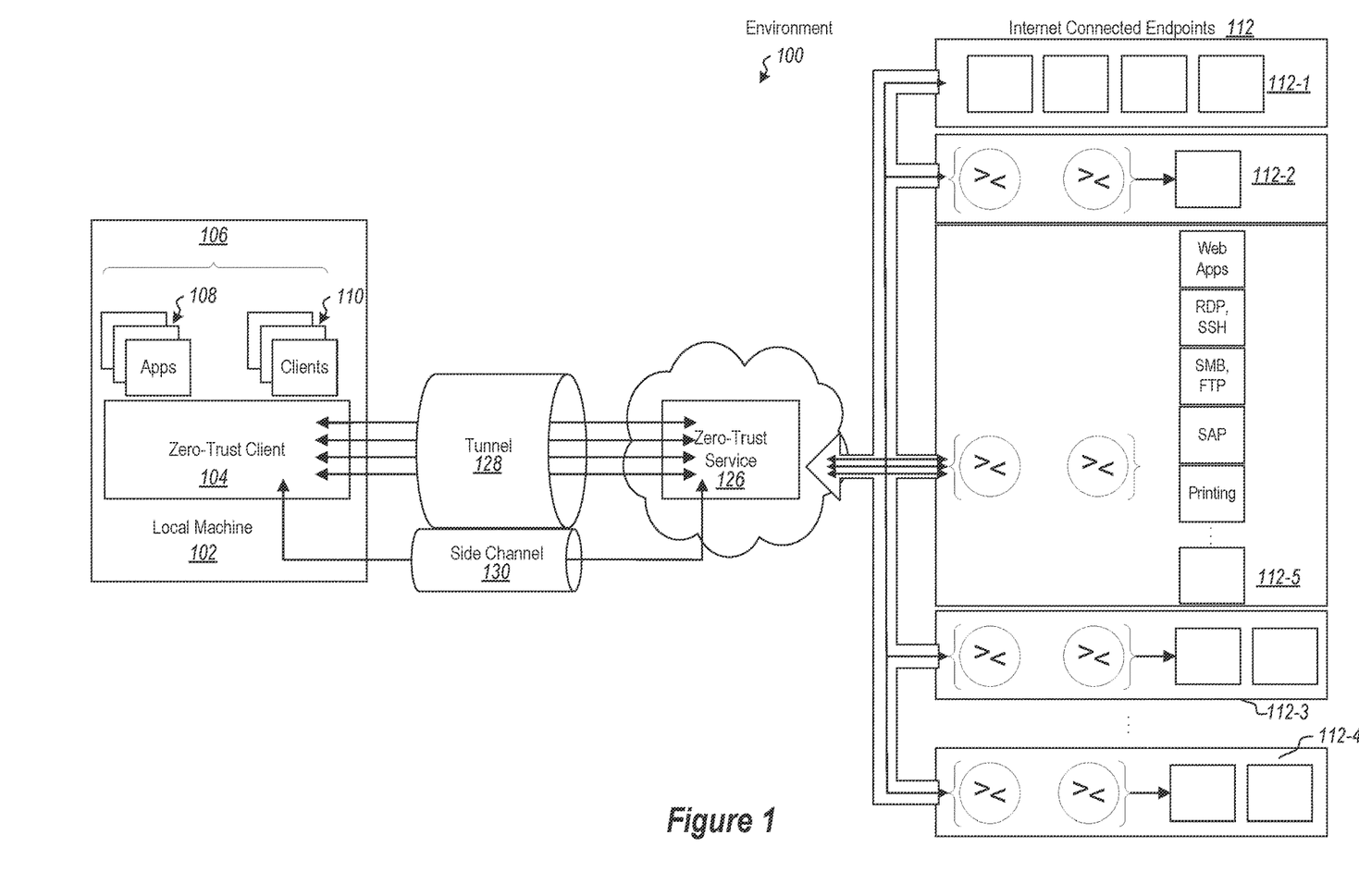
FIG. 1 illustrates an overview block diagram of a zero-trust client and zero-trust service being used to connect with internet connected endpoints.

Referring now to FIG. 1, an example embodiment is illustrated. FIG. 1 illustrates an environment 100 where zero-trust domain name resolution may be performed. FIG. 1 illustrates a local machine 102. The local machine 102 may be, for example, a user's desktop or laptop computer, a tablet device, a smartphone, or other computing device. The local machine 102 may be a device used by an employee user to access company resources.

The local machine 102 includes a zero-trust client 104. The zero-trust client 104 is a security application running on the local machine 102. As will be illustrated below, the zero-trust client 104 is configured to facilitate secure communications between the local machine 102 and company resources and/or other internet connected endpoints by using synthetic IP addresses generated by the zero-trust client 104.

The local machine 102 includes further includes one or more applications 106 having components implemented for connecting to internet connected endpoints. For example, the applications 106 may include routines configured to package/unpackage data for transmission/reception on networks, and interfaces to send/receive data external to the applications 106. In the example illustrated in FIG. 1, apps 108 and clients 110 are illustrated as examples of applications 106. As further examples, a given application in the applications 106 may be an internet browser, a browser-based app, a rich client, a thin client, an app (e.g., a simplified application configured for mobile applications or having simplified user interface elements as compared to more feature rich versions of an application), or other application.

In the example illustrated in FIG. 1, the applications 106 may be implemented in the environment 100 and on the local machine 102 in a fashion that facilitates the applications connecting with internet connected endpoints. FIG. 1 illustrates a number of different internet connected endpoints 112. For example, FIG. 1 illustrates a website internet connected endpoint 112-1 (e.g., an endpoint hosting commonly available websites), cloud service internet connected endpoints 112-2, 112-3, and 112-4 (e.g., SaaS, PaaS, IaaS endpoints), and a private access corporate network internet connected endpoint 112-5 (e.g., a corporate network).

Figure 2:
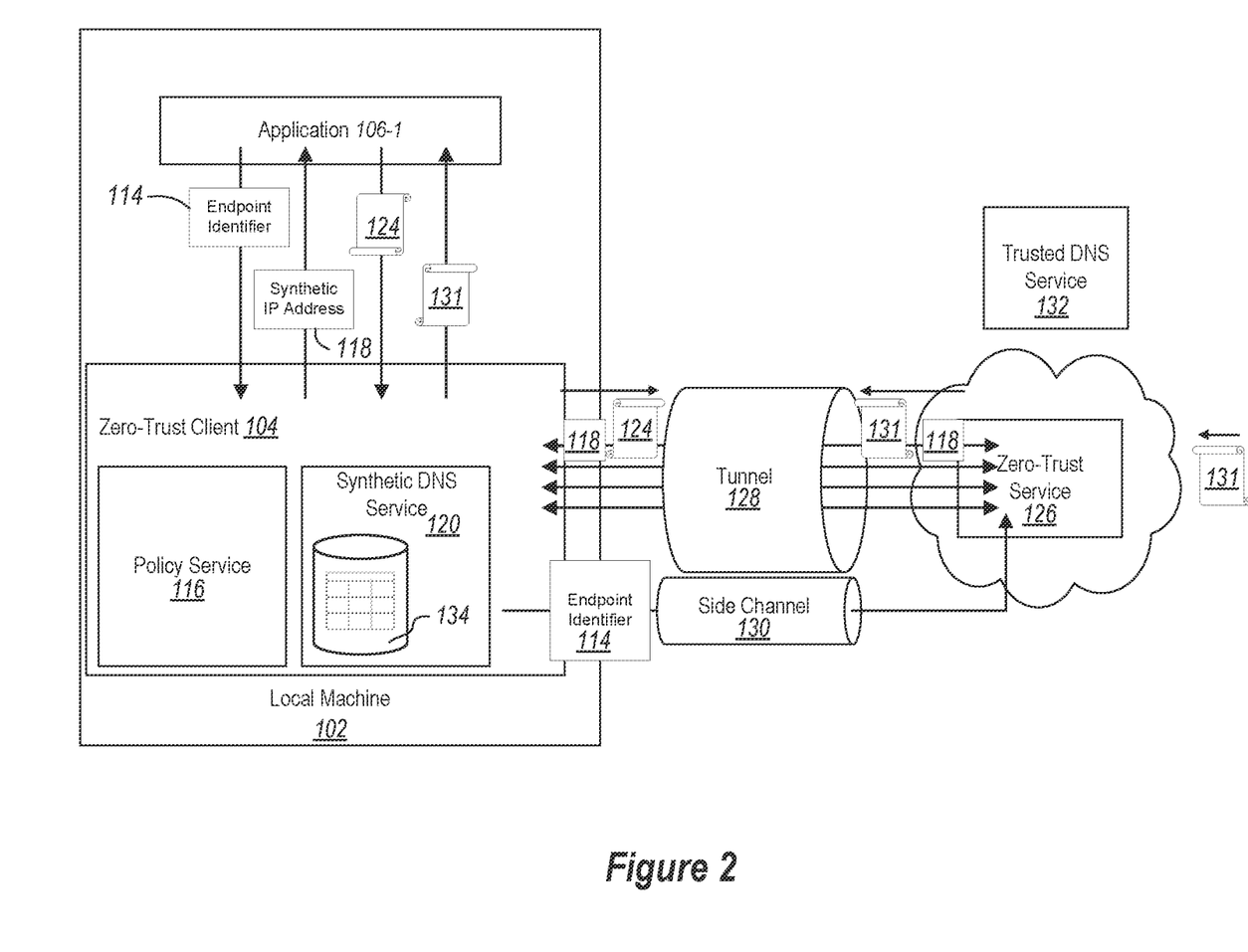
FIG. 2 illustrates a block diagram of a zero-trust client communicating with a zero-trust service.

Referring now to FIG. 2, in addition to reference to FIG. 1, additional details are illustrated. An application 106-1 (i.e., one of the applications 106) can send a request to the zero-trust client 104 for an IP address corresponding to an endpoint identifier 114 for an internet connected endpoint. For example, the client may send a FQDN, PQDN, IP address, GUID, text string description, or other endpoint identifier that can be used to uniquely identify the internet connected endpoint. As a specific example, the application 106-1 may be an internet browser. A user may interact with the application 106-1 by typing the FQDN "www.contoso.com" in an address bar of the application 106-1. The application 106-1 then sends the FQDN endpoint identifier 114 "www.contoso.com", in a request for an IP address, to the zero-trust client 104. In particular, the local machine 102 may be configured to route network traffic through the zero-trust client 104.

The zero-trust client 104 receives the endpoint identifier from the application 106-1. The zero-trust client 104 may then determine whether or not to use a synthetic IP address for the endpoint identifier 114. Generally, the zero-trust client will use policy available to the zero-trust client 104 to determine whether or not to use a synthetic IP address for the endpoint identifier. FIG. 2 illustrates a policy service 116, which represents the ability of the local machine 102 to apply policy to endpoint identifiers. While the policy service 116 may be implemented as an application running at the local machine 102, it may be implemented in other fashions, additionally or alternatively, such as by including elements off of the local machine 102. The policy service 116, as explained in more detail below, can determine what types of network traffic should be collected and have a synthetic IP address applied.

In the example illustrated in FIG. 2, if the zero-trust client 104 determines to apply a synthetic IP address, then the zero-trust client 104, identifies a synthetic IP address 118 for the endpoint identifier 114. A synthetic IP address 118 is generally an IP address for the endpoint identifier 114 that is allowed to differ from an IP address that is assigned to the endpoint identifier by a trusted DNS. The synthetic IP address 118 has meaning within the context of a zero-trust security framework while having no, limited, or even incorrect meaning outside of the context of the zero-trust security framework. For example, the synthetic IP address may be a private IP address. As an example, in the IPv4 internet protocol, the synthetic IP address 118 may be assigned in the private address range 10.0.0.0 to 10.255.255.255, or some other private address range. The synthetic IP address 118 may be a public address but a public address that does not correspond with the endpoint identifier 114. For example, the actual public IP address for www.contoso.com, available from a trustworthy DNS service may be 20.84.181.62. However, the synthetic IP address 118 identified by the zero-trust client 104 may be 13.107.6.156, which is actually the public IP address for www.office.com. Thus, in this case, if the synthetic IP address were used directly outside of the context of the zero-trust security framework, incorrect network resolution would occur. Indeed, the synthetic IP address 118 could even be an Internet wide reserved address such as 240.0.0.0, which has been reserved for future use. This is allowed inasmuch as the synthetic IP address 118 will be used as such within the context of the zero-trust security framework.

In response to the request for an IP address corresponding to the endpoint identifier 114, the zero-trust client 104 provides the synthetic IP address 118 for the endpoint identifier 114 to the application 106-1. FIG. 2 illustrates that the zero-trust client 104 includes a synthetic DNS service 120. The synthetic DNS service can obtain and/or produce synthetic IP addresses such as the synthetic IP address 118. The synthetic DNS service is an application run on the hardware of the local machine 102 or in another appropriate location. The synthetic DNS further includes a synthetic DNS data store 134 which correlates endpoint identifiers with synthetic IP addresses.

The application 106-1, having the synthetic IP address can now send data traffic 124, which is received by the zero-trust client 104. The data traffic 124 is directed to the internet connected endpoint, which could be any appropriate internet connected endpoint, such as internet connected endpoints 112-1 through 112-5. The data traffic 124 is associated with the synthetic IP address 118 by the application 106-1. For example, the application 106-1 may create a data packet including a destination header, where the data packet includes the data traffic 124 and the destination header includes the synthetic IP address 118. This data packet is then sent to the zero-trust client 104.

The zero-trust client 104 then sends the data traffic 124 to a zero-trust service 126. The synthetic IP address 118 is also sent to the zero-trust service 126. Typically, this is done by sending the packet from the application 106-1 to the zero-trust service 126. Often, the data traffic 124 and synthetic IP address 118 are sent through an encrypted tunnel 128, which may be, for example, a conventional encrypted tunnel.

The zero-trust client 104 also sends the endpoint identifier 114 to the zero-trust service in a fashion that allows the synthetic IP address 118 to be correlated to the endpoint identifier 114 at the zero-trust service 126. For example, this could be done by correlating a session used for sending the packet containing the synthetic IP address 118 with communications containing the endpoint identifier 114. Note that in other embodiments, this may be done in a stateless fashion but with identifiers in the various communications allowing them to be correlated. Note that the endpoint identifier 114 is typically sent, out of band, on a side channel 130.

As will be discussed in more detail below, the zero-trust service 126 directs the data traffic 124 to the internet connected endpoint by using the endpoint identifier 114 to obtain a globally valid IP address from a trusted DNS service 132. The zero-trust service 126 may then receive response data traffic 131 directed from the internet connected endpoint to the application 106-1. Thus, the local machine 102 may receive response data traffic 131 in response to the data traffic 124. The response data traffic 131 may be, for example, web pages, cloud service data, user interface code, acknowledgments, or other types of data provided by internet connected endpoints 112. The response data traffic 131 is associated with the synthetic IP address 118. For example, the zero-trust service 126 may create a data packet having the response data traffic 131 in a data field of the packet, and the synthetic IP address in a destination field of the data packet. Thus, in some embodiments the zero-trust client 104 uses the synthetic IP address to provide the response data traffic 131 to the application 106-1.

As noted previously, the zero-trust client 104 can evaluate policy. In such embodiments, the zero-trust client 104 identifies the synthetic IP address 118 as a result of the endpoint identifier 114 meeting a particular condition of the policy. Thus, for example, the policy service 116 may compare endpoint identifiers to determine if communications from application should be captured and subjected to the protections of the zero-trust security framework. For example, policy may indicate that any endpoint identifiers to websites should be captured by the zero-trust client 104 and synthetic IP addresses should be identified for those endpoint identifiers. Alternatively, or additionally, policy may indicate that endpoint identifiers to particular types of websites (e.g., social networking, adult content, containing violence, containing or encouraging illegal activity, etc.) should be captured by the zero-trust client 104 and synthetic IP address should be identified for those endpoint identifiers. Alternatively, or additionally, policy may indicate that endpoint identifiers to corporate network internet connected endpoints (e.g., corporate applications, network nodes, services, etc.) should be captured by the zero-trust client 104 and synthetic IP addresses should be identified for those endpoint identifiers. Alternatively, or additionally, policy may indicate that endpoint identifiers to cloud service internet connected endpoints, or certain cloud service internet connected endpoints should be captured by the zero-trust client 104 and synthetic IP addresses should be identified for those endpoint identifiers. Note that conditions of policy may be role based such that internet connected endpoints are treated differently depending on the role of the user sending data to the internet connected endpoint. For example, individuals in a corporate legal department may have different network traffic captured and synthetic IP addresses identified as compared to individuals in a corporate accounting department.

In some embodiments, the zero-trust client 104 may receive information from the zero-trust service 126 identifying what suffixes of endpoint identifiers are supported by internet connected entities accessible to the zero-trust service. For example, such suffixes may identify the types of services, Using the information such embodiments identify what suffixes of endpoint identifiers are supported by the internet connected entities accessible to the zero-trust service to evaluate the policy.

In some embodiments, the zero-trust client 104 may store a correlation of endpoint identifiers with synthetic IP address. FIG. 2 illustrates synthetic IP address data store 134. Note that in some embodiments, the data store 134 may be prepopulated and stored statically such that the correction remains even when the local machine 102 is power cycled. In some embodiments, this could further include the zero-trust client 104 surveying the applications 106 to determine possible internet connected endpoints that the applications 106 might attempt to contact, pre-identifying synthetic IP addresses for those endpoints, and storing correlating information in the data store 134. Thus, in some embodiments, a particular synthetic IP address could be used over different sessions, power cycles, or other periods.

In some embodiment, the zero-trust client 104 is able to obtain a DNS provided IP address 136 (see FIG. 3) using the endpoint identifier 114 and to provide the DNS provided IP address 136 to the zero-trust service 126. In some embodiments, the zero-trust client 104 can send the endpoint identifier 114 to a DNS service 138 used by the local machine 102. This may be a DNS service for an ISP for the network on which the local machine 102 is connected or some other DNS service specified for the local machine 102. In some embodiments, the DNS service 132 is untrusted with respect to the zero-trust service 126. As will be explained in more detail below, sending the DNS provided IP address 136 to the zero-trust service 126 may be useful when the trusted DNS service 132 is unavailable.

Figure 3:
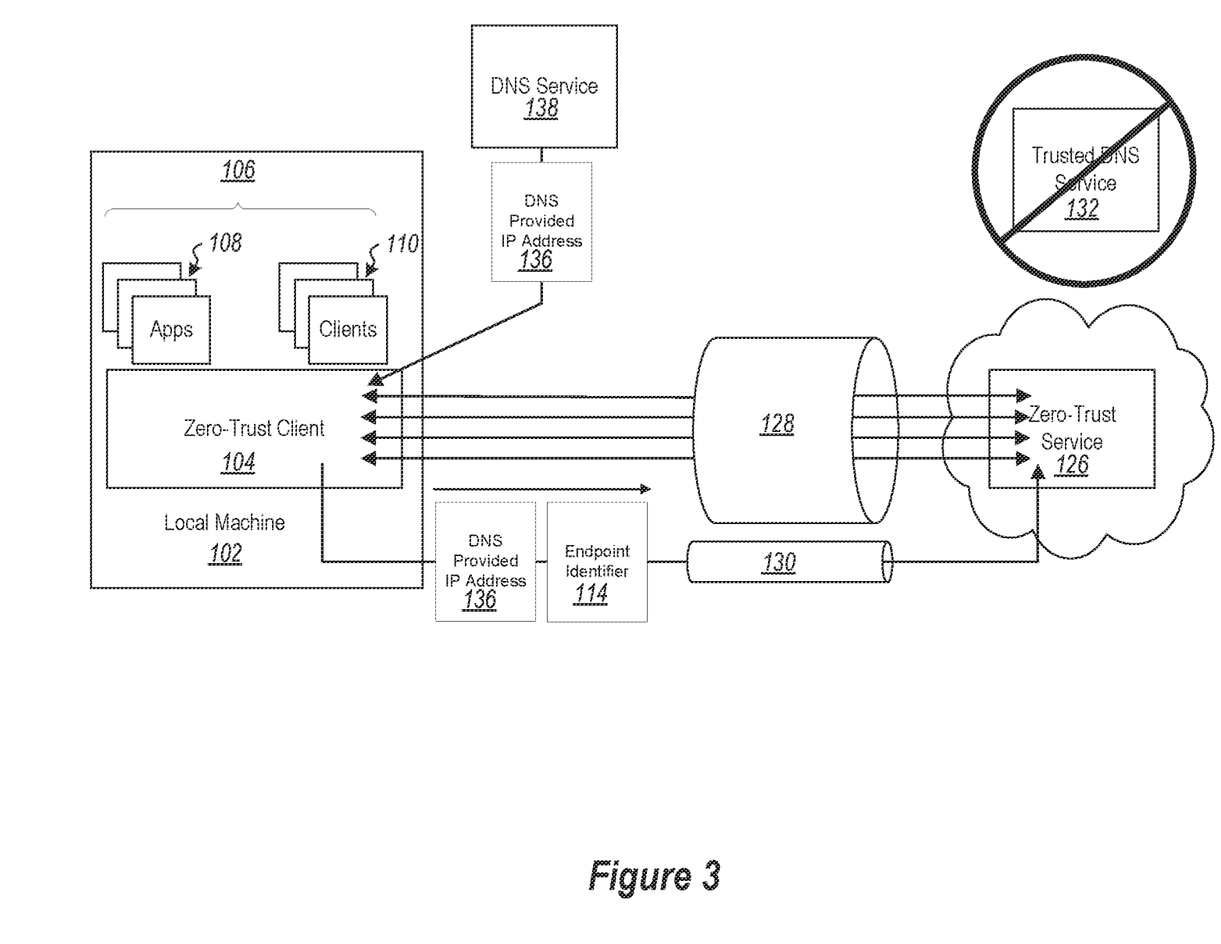
FIG. 3 illustrates a block diagram of a zero-trust client communicating with a zero-trust server where the zero-trust client provides DNS provided IP addresses to the zero-trust service.

Attention is now directed to additional details regarding the zero-trust service 126. The zero-trust service 126 can receive from zero-trust clients at local machines, data traffic and a synthetic IP addresses. In the examples illustrated in FIGS. 1-4, the zero-trust service 126 is also configured to receive endpoint identifiers from zero-trust clients. For example, FIG. 3 illustrates the zero-trust service 126 receiving the endpoint identifier 114 from the zero-trust client 104 at the local machine 102. Recall that the endpoint identifiers are for internet connected endpoints. The endpoint identifiers are received in a fashion that allows the synthetic IP addresses to be correlated to the endpoint identifiers.

The zero-trust service 126 is configured to obtain a trusted IP address 140 for the endpoint identifier 114. For example, FIG. 2 illustrates that the zero-trust service has access to a trusted DNS service 132 where it can obtain a trusted IP address 140 for the endpoint identifier 114 and therefore, for the corresponding internet connected endpoint (i.e., the internet connected endpoint from among the internet connected endpoints 112 corresponding with the endpoint identifier 114).

Figure 4:
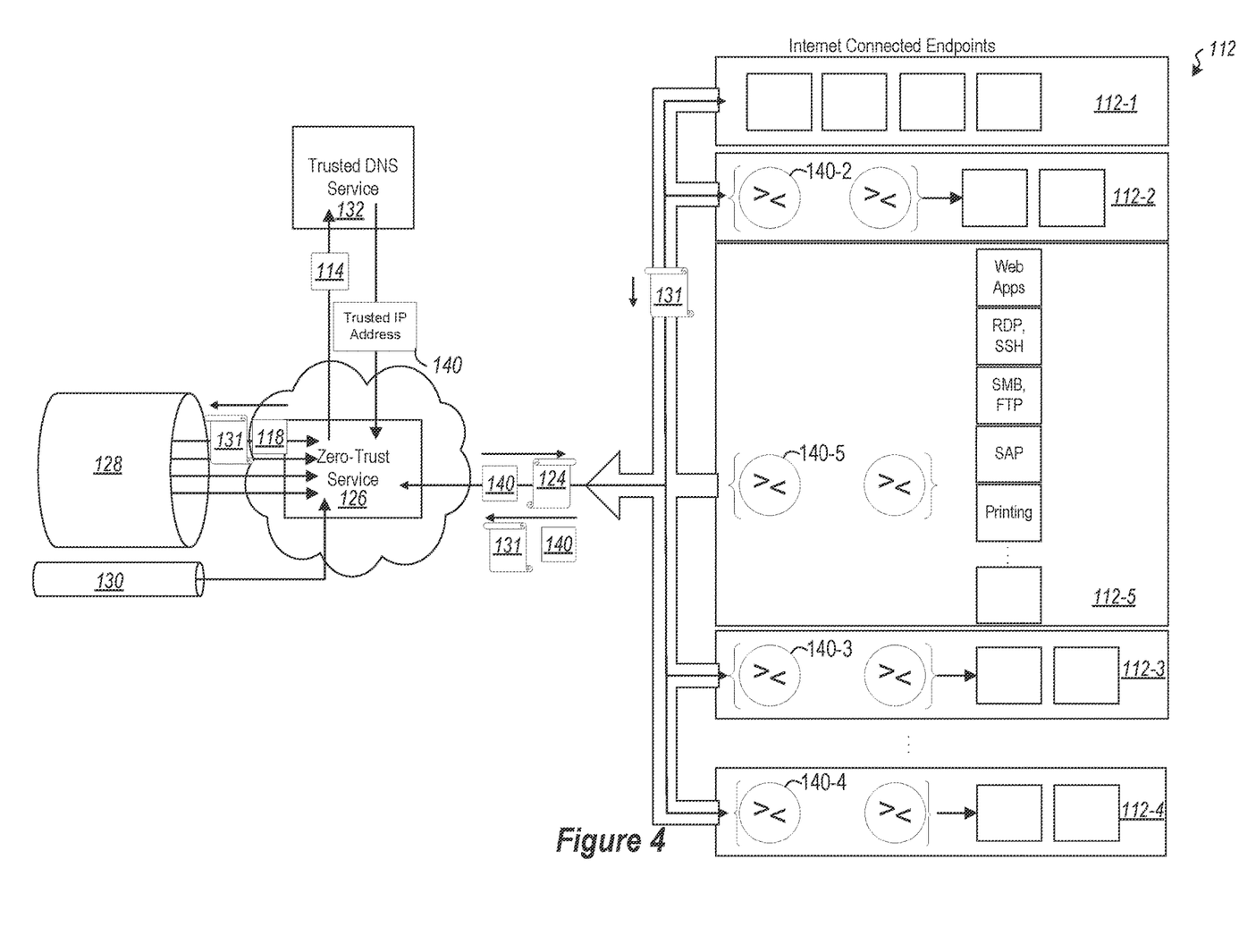
FIG. 4 illustrates a block diagram of a zero-trust service communicating with internet connected endpoints.

Using the trusted IP address 140, the zero-trust service 126 sends the data traffic 124 to the internet connected endpoint corresponding to endpoint identifier 114. FIG. 4 illustrates an example where the data traffic 124 is sent with the trusted IP address 140 to the Internet connected endpoints 112 where the trusted IP address 140 is used to address the data traffic 124 to a particular internet connected endpoint.

The zero-trust service 126 receives response data traffic 131 from the internet connected endpoint. As illustrated in FIG. 4, the response data traffic 131 may be sent with the trusted IP address 140. For example, an internet connected endpoint may return a packet where the packet includes the trusted IP address 140 in a header as a source address and the response data traffic 131 is included in a data portion of the packet.

The zero-trust service 126 provides the response data traffic 131 to the local machine 102 with the response data traffic correlated to the synthetic IP address 118. For example, the zero-trust service may create a new packet where the new packet includes the synthetic IP address as the source address in a header of the new packet, with the response data traffic 131 included in the data portion of the packet.

As illustrated previously, in FIG. 2, the data traffic 124 and the synthetic IP address 118 may be received by the zero-trust service using an encrypted tunnel 128. In some embodiments, as discussed previously, and as illustrated in FIG. 2, the zero-trust service 126 may receive the endpoint identifier 114 for the internet connected endpoint using a side channel 130. Side channel 130 is ancillary to a channel (e.g., the tunnel 128) used for receiving the data traffic 124 and the synthetic IP address 118.

In some embodiments, the zero-trust service 126 may receive a DNS provided IP address correlated to the internet connected endpoint from the zero-trust client 104. For example, as illustrated in FIG. 3, a DNS provided IP address 136 may be obtained by the zero-trust client 104, and provided to the zero-trust service 126. In some embodiments, the DNS provided IP address 136 is provided to the zero-trust service 126 using the side channel 130, or an alternate side channel. In the example illustrated in FIG. 3, the zero-trust service 126 uses the DNS provided IP address 136 as a trusted IP address to send data traffic 124.

In some embodiments, the zero-trust service 126 may receive a DNS provided IP address correlated to the internet connected endpoint from a plurality of different zero-trust clients at different local machines. The zero-trust service 126 can use this information to determine that the DNS provided IP address 136 is trusted. That is, because a number of different machines provided an IP address, presumably without coordination, some trust in the DNS provided IP address 136 can be inferred. Note that the DNS provided IP address 136 may be provided using side channels as discussed above. As a result of the DNS provided IP address 136 being trusted, it can be used as the trusted IP address when sending data to internet connected endpoints.

In some embodiments, the zero-trust service 126 may receive a plurality of DNS provided IP addresses correlated to a given internet connected endpoint from a plurality of different zero-trust clients at different local machines. Note that it is likely that many or all of the DNS provided IP addresses are the same actual address. However, some of the addresses may differ in value from each other. The zero-trust service 126 may further receive information, from the various zero-trust clients, identifying sources of the DNS provided IP addresses. Often, different DNS services may provide the IP addresses to the different zero-trust clients. For example, work from home employees may use different internet service providers, which each in turn use different DNS services. Such DNS services include, for example, Comcast, Quest, G-Core, Cloudflare, OpenDNS, Google Public DNS, Quad9 DNS, Oracle DNS, Verisign Public DNS, Akamai, Amazon Route 53, etc. The information identifying sources of the DNS provided IP addresses can be used to evaluate the different IP addresses provided by the various zero-trust clients. Some DNS service providers may be perceived as being more reliable than others. The zero-trust service 126 can determine what IP address to use as a trusted IP address for the internet connected endpoint using the information about the DNS service providers.

In some embodiments, the internet connected endpoint is a private internet connected endpoint. For example, the corporate network interconnected endpoint 112-5 and various cloud service internet connected endpoints 112-2, 112-3, and 112-4. will often have sub-internet connected endpoints that are private to the internet connected endpoint. For example, an endpoint identifier provided by an application may be payroll.contoso.com. A public DNS service, such as the trusted DNS service 132 will not be able to resolve this to an IP address. To address this, the zero-trust service may include functionality for polling secure connection connectors. These secure connection connectors are implemented at a internet connected entities hosting internet connected endpoints for an IP address corresponding to the private internet connected endpoint. FIG. 4 illustrates connectors 140-2, 140-3, 140-4, and 140-5 corresponding to the internet connected endpoints 112-2, 112-3, 112-4, and 112-5 respectively. The zero-trust service 126 can poll the connectors 140-2, 140-3, 140-4, and 140-5 to identify which connectors are used with the endpoint identifier payroll.contoso.com. In this way, the zero-trust service 126 can obtain a trusted IP address for an endpoint identifier as a result of polling secure connection connectors.

In some such embodiments, the zero-trust service 126 can send an IP address corresponding to the private internet connected endpoint to the zero-trust client 104 on the local machine 102. This may be done using the side channel 130 or other appropriate channel. The zero-trust service 126 can then receive the same IP address corresponding to the private internet connected endpoint from the zero-trust client 104 on the local machine 102 correlated to the endpoint identifier. The zero-trust service uses the IP address corresponding to the private internet connected endpoint as a trusted IP address.

In some embodiments, the zero-trust service 126 can cache the IP address corresponding to the private internet connected endpoint for subsequent communication with zero-trust clients sending the endpoint identifier corresponding to the private internet connected endpoint.

In some embodiments, the zero-trust service 126 may be configured to poll all known connectors for all known private internet connected endpoints and corresponding IP addresses. The IP addresses can be cached and used as appropriate. In particular, embodiments may include functionality for polling secure connection connectors implemented at a plurality of internet connected entities hosting internet connected endpoints to determine what suffixes of endpoint identifiers are supported by the internet connected entities. Information can then be provided to the zero-trust client 104 identifying what suffixes of endpoint identifiers are supported by the internet connected entities.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
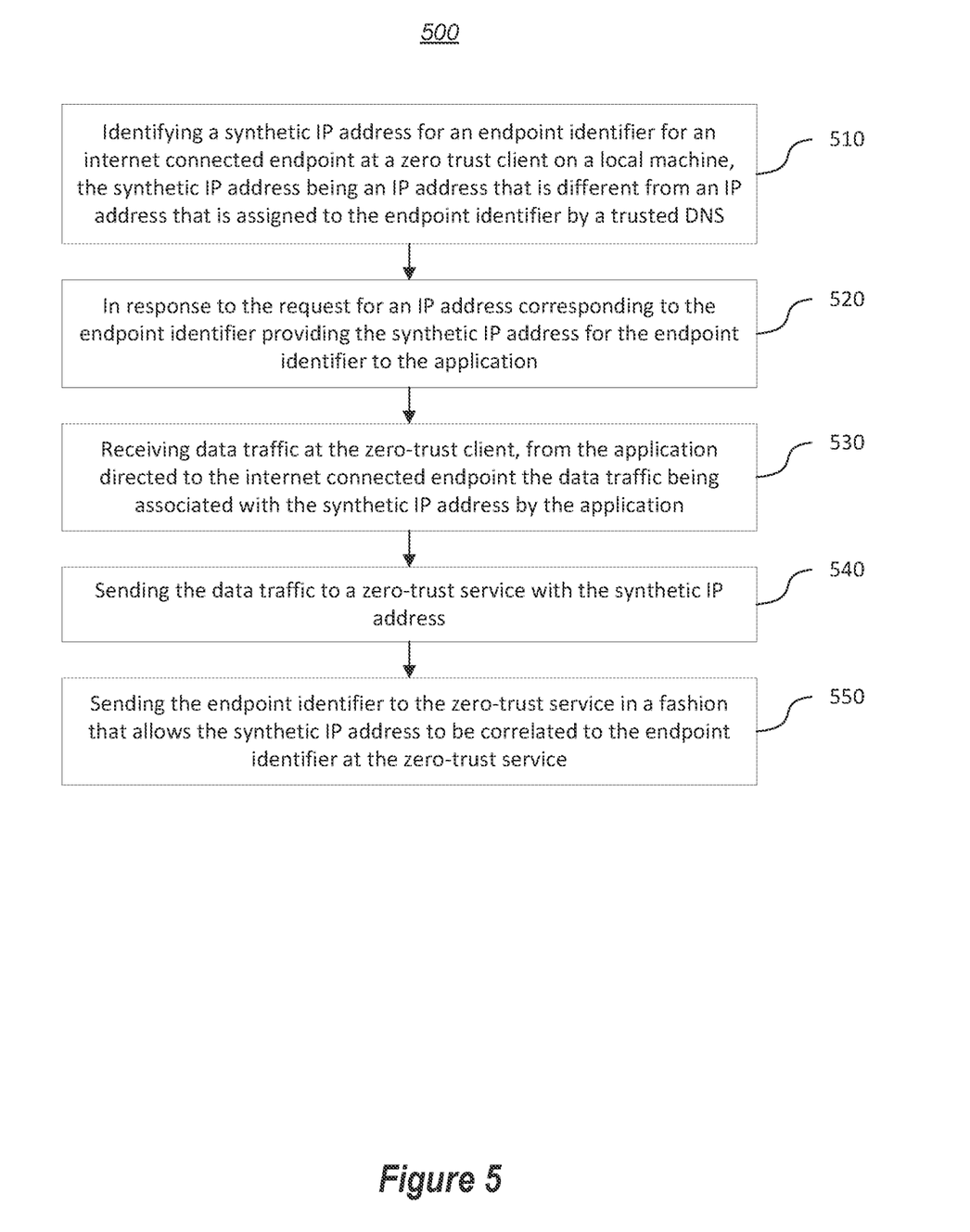
FIG. 5 illustrates a method of performing zero-trust domain name resolution.

FIG. 5 is a flowchart of an example method for performing zero-trust domain name resolution.

At step 510, the method 500 includes identifying a synthetic IP address for an endpoint identifier for an internet connected endpoint. The synthetic IP address is an IP address that is different from an IP address that is assigned to the endpoint identifier by a trusted DNS service configured to provide globally valid IP addresses.

At step 520, in response to the request for an IP address corresponding to the endpoint identifier, the method 500 includes providing the synthetic IP address for the endpoint identifier to the application.

At step 530, the method includes receiving data traffic at the zero-trust client, from the application directed to the internet connected endpoint. The data traffic is associated with the synthetic IP address by the application.

At step 540, the method includes sending the data traffic to a zero-trust service with the synthetic IP address.

At step 550, the method includes sending the endpoint identifier to the zero-trust service in a fashion that allows the synthetic IP address to be correlated to the endpoint identifier at the zero-trust service.

The method may also include receiving at the local machine, response data traffic in response to the data traffic. The response data traffic is associated with the synthetic IP address. In such embodiments, the method 500 may also include using the synthetic IP address, providing the response data traffic to the application.

The method 500 may further include the zero-trust client evaluating policy. In such embodiments, the step of the zero-trust client identifying the synthetic IP address is performed as a result of the endpoint identifier meeting a particular condition of the policy. Additionally, in some such embodiments, the method 500 may further include receiving information from the zero-trust service identifying what suffixes of endpoint identifiers are supported by internet connected entities accessible to the zero-trust service. This information is used to evaluate the policy.

The method 500 may be practiced where sending the endpoint identifier to the zero-trust service comprises sending the endpoint identifier to the zero-trust service on a side channel.

The method 500 may further include the zero-trust client storing a static correlation of endpoint identifiers with synthetic IP address.

The method 500 may further include the zero-trust client obtaining a DNS provided IP address using the endpoint identifier. The zero-trust client then provides the DNS provided IP address to the zero-trust service.

Figure 6:
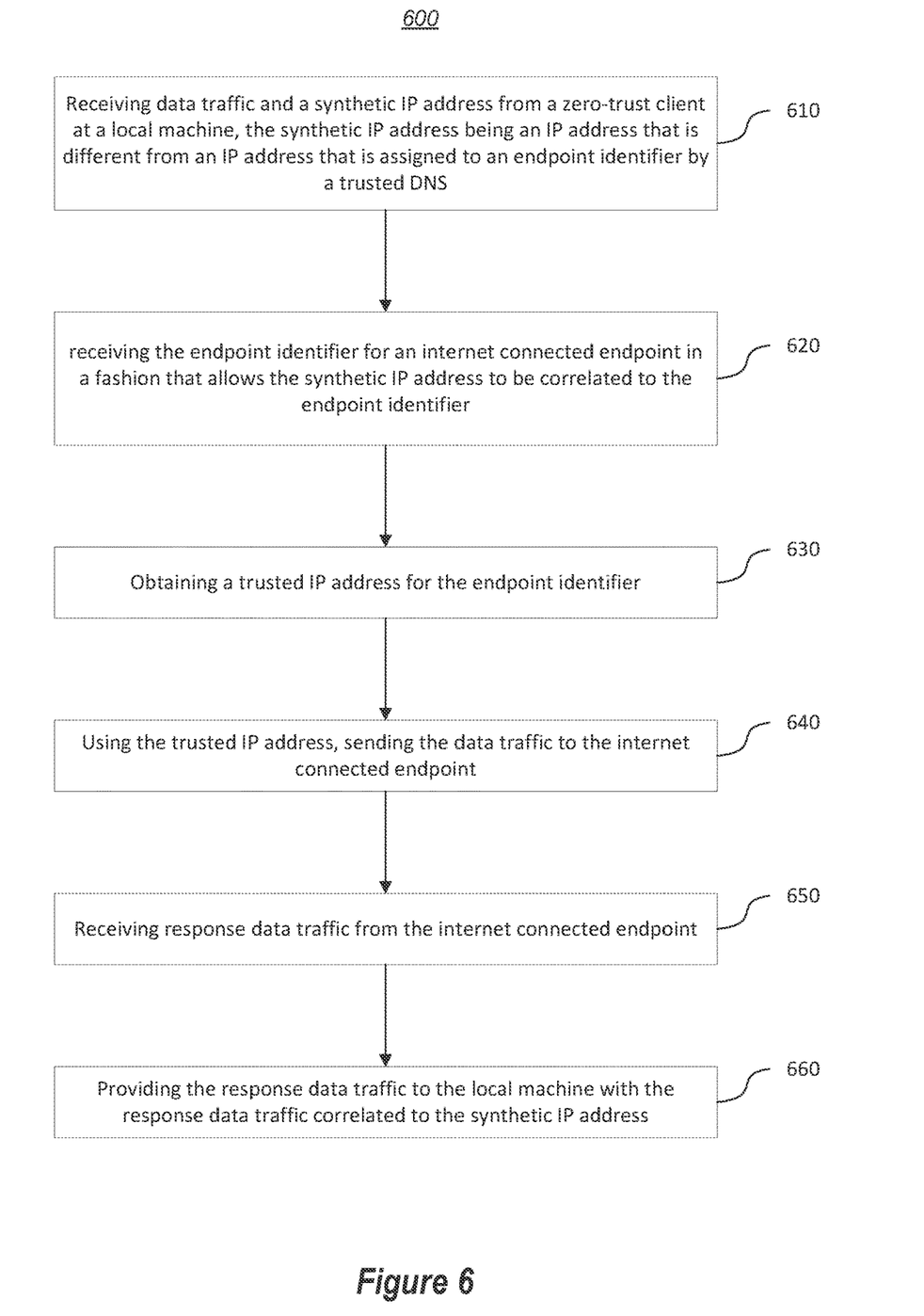
FIG. 6 illustrates another method of performing zero-trust domain name resolution.

FIG. 6 is a flowchart of an example method for performing zero-trust domain name resolution.

At step 610, the method 600 includes receiving data traffic and a synthetic IP address from a zero-trust client at a local machine. The synthetic IP address is an IP address that is different from an IP address that is assigned to an endpoint identifier by a trusted DNS service configured to provide globally valid IP addresses.

At step 620, the method 600 includes, receiving the endpoint identifier for an internet connected endpoint in a fashion that allows the synthetic IP address to be correlated to the endpoint identifier.

At step 630, the method 600 includes, obtaining a trusted IP address for the endpoint identifier.

At step 640, the method 600 includes using the trusted IP address, sending the data traffic to the internet connected endpoint.

At step 650, the method 600 includes, receiving response data traffic from the internet connected endpoint.

At step 660, the method 600 includes providing the response data traffic to the local machine with the response data traffic correlated to the synthetic IP address.

The method 600 may be practiced where receiving the data traffic and the synthetic IP address is performed using an encrypted tunnel.

The method 600 may be practiced where receiving the endpoint identifier for the internet connected endpoint is performed using a side channel ancillary to a channel used for receiving the data traffic and the synthetic IP address.

The method 600 may be practiced where providing the response data traffic to the local machine with the response data traffic correlated to the synthetic IP address is performed using an encrypted tunnel.

The method 600 may further include receiving a DNS provided IP address correlated to the internet connected endpoint from the zero-trust client 104. In this example, using the trusted IP address comprises using the DNS provided IP address.

The method 600 may further include receiving a DNS provided IP address correlated to the internet connected endpoint from a plurality of different zero-trust clients at different local machines. Based on receiving a DNS provided IP address from the plurality of different zero-trust clients at different local machines, The method 600 may further include determining that the DNS provided IP address is trusted. In this case, using the trusted IP address comprises using the DNS provided IP address.

The method 600 may further include receiving DNS provided IP addresses correlated to the internet connected endpoint from a plurality of different zero-trust clients at different local machines. This embodiment may further include receiving information identifying sources of the DNS provided IP addresses. The information identifying sources of the DNS provided IP addresses is used to identify the trusted IP address for the internet connected endpoint. Embodiments then determine that the DNS provided IP address is trusted, based on receiving a DNS provided IP address from the plurality of different zero-trust clients at different local machines. As such, using the trusted IP address comprises using the DNS provided IP address.

The method 600 may be practiced where the internet connected endpoint is a private internet connected endpoint. In some such embodiments, the method 600 may further includes polling secure connection connectors implemented at a plurality of internet connected entities hosting internet connected endpoints for an IP address corresponding to the private internet connected endpoint. In some such embodiments, obtaining the trusted IP address for the endpoint identifier is accomplished as a result of polling the secure connection connectors. Some such embodiments may further include sending the IP address corresponding to the private internet connected endpoint to the zero-trust client on the local machine. The IP address corresponding to the internet connected endpoint is received from the zero-trust client on the local machine correlated to the endpoint identifier. The IP address corresponding to the internet connected endpoint is used as the trusted IP address. The method may further include caching the IP address corresponding to the private internet connected endpoint for subsequent communication with zero-trust clients sending the endpoint identifier corresponding to the private internet connected endpoint.

The method 600 may further include polling secure connection connectors implemented at a plurality of internet connected entities hosting internet connected endpoints to determine what suffixes of endpoint identifiers are supported by the internet connected entities. Information is provided to the zero-trust client identifying what suffixes of endpoint identifiers are supported by the internet connected entities.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of performing zero-trust domain name resolution, the method comprising:
    receiving data traffic and a synthetic IP address from a zero-trust client at a local machine, the synthetic IP address being an IP address that is different from an IP address that is assigned to an endpoint identifier by a trusted DNS service configured to provide globally valid IP addresses;
    receiving the endpoint identifier for an internet connected endpoint in a fashion that allows the synthetic IP address to be correlated to the endpoint identifier;
    obtaining a trusted IP address for the endpoint identifier; and
    using the trusted IP address, sending the data traffic to the internet connected endpoint.

2. The method of claim 1, wherein receiving the data traffic and the synthetic IP address is performed using an encrypted tunnel.

3. The method of claim 1, wherein receiving the endpoint identifier for the internet connected endpoint is performed using a side channel ancillary to a channel used for receiving the data traffic and the synthetic IP address.

4. The method of claim 1, further comprising:
    receiving a DNS provided IP address correlated to the internet connected endpoint from the zero-trust client 104; and
    wherein using the trusted IP address comprises using the DNS provided IP address.

5. The method of claim 1, further comprising:
    receiving a DNS provided IP address correlated to the internet connected endpoint from a plurality of different zero-trust clients at different local machines;
    based on receiving a DNS provided IP address from the plurality of different zero-trust clients at different local machines, determining that the DNS provided IP address is trusted; and
    wherein using the trusted IP address comprises using the DNS provided IP address.

6. The method of claim 1, further comprising:
    receiving DNS provided IP addresses correlated to the internet connected endpoint from a plurality of different zero-trust clients at different local machines;
    receiving information identifying sources of the DNS provided IP addresses;
    using the information identifying sources of the DNS provided IP addresses, identifying the trusted IP address for the internet connected endpoint; and
    based on receiving a DNS provided IP address from the plurality of different zero-trust clients at different local machines, determining that the DNS provided IP address is trusted; and
    wherein using the trusted IP address comprises using the DNS provided IP address.

7. The method of claim 1, wherein the internet connected endpoint is a private internet connected endpoint, the method further comprising:
    polling secure connection connectors implemented at a plurality of internet connected entities hosting internet connected endpoints for an IP address corresponding to the private internet connected endpoint; and
    wherein obtaining the trusted IP address for the endpoint identifier is accomplished as a result of polling the secure connection connectors.

8. The method of claim 7, further comprising:
    sending the IP address corresponding to the private internet connected endpoint to the zero-trust client on the local machine;
    receiving the IP address corresponding to the internet connected endpoint from the zero-trust client on the local machine correlated to the endpoint identifier; and
    using the IP address corresponding to the internet connected endpoint as the trusted IP address.

9. The method of claim 7, further comprising caching the IP address corresponding to the private internet connected endpoint for subsequent communication with zero-trust clients sending the endpoint identifier corresponding to the private internet connected endpoint.

10. The method of claim 1, further comprising:
    polling secure connection connectors implemented at a plurality of internet connected entities hosting internet connected endpoints to determine what suffixes of endpoint identifiers are supported by the internet connected entities; and
    providing information to the zero-trust client identifying what suffixes of endpoint identifiers are supported by the internet connected entities.

11. A method of performing zero-trust domain name resolution, the method comprising:
    identifying a synthetic IP address for an endpoint identifier for an internet connected endpoint at a zero-trust client on a local machine, the synthetic IP address being an IP address that is different from an IP address that is assigned to the endpoint identifier by a trusted DNS service configured to provide globally valid IP addresses;
    in response to a request for an IP address corresponding to the endpoint identifier from an application on the local machine providing the synthetic IP address for the endpoint identifier to the application;
    receiving data traffic at the zero-trust client, from the application directed to the internet connected endpoint, the data traffic being associated with the synthetic IP address by the application; and
    sending the data traffic to a zero-trust service with the synthetic IP address, wherein the synthetic IP address is correlated to the endpoint identifier at the zero-trust service.

12. The method of claim 11, further comprising the zero-trust client evaluating policy, and wherein the zero-trust client identifying the synthetic IP address is performed as a result of the endpoint identifier meeting a particular condition of the policy.

13. The method of claim 12, further comprising:
    receiving information from the zero-trust service identifying what suffixes of endpoint identifiers are supported by internet connected entities accessible to the zero-trust service; and using the information identifying what suffixes of endpoint identifiers are supported by the internet connected entities accessible to the zero-trust service to evaluate the policy.

14. The method of claim 11, further comprising sending the endpoint identifier to the zero-trust service on a side channel.

15. The method of claim 11, further comprising the zero-trust client storing a static correlation of endpoint identifiers with synthetic IP address.

16. The method of claim 11, further comprising:
   the zero-trust client obtaining a DNS provided IP address using the endpoint identifier; and
   the zero-trust client providing the DNS provided IP address to the zero-trust service.

17. A computing system configured to perform zero-trust domain name resolution, the computing comprising:
   one or more hardware processors; and
   one or more hardware storage device storing one or more applications and computer-executable instructions that are executable by the one or more hardware processors for controlling:
      a zero-trust client coupled to the one or more applications, wherein the zero-trust client is configured to receive requests for IP addresses corresponding to endpoint identifiers for internet connected endpoints;
      wherein the zero-trust client comprises a synthetic DNS service configured to identify synthetic IP addresses for the endpoint identifiers, the synthetic IP addresses being IP addresses that are different from corresponding IP addresses assigned to the endpoint identifiers by a trusted DNS service configured to provide globally valid IP addresses;
      wherein the zero-trust client is configured to provide the synthetic IP addresses for the endpoint identifiers to the applications; and
      wherein the zero-trust client is configured to send data traffic from the applications to a zero-trust service with the synthetic IP addresses where corresponding synthetic IP addresses are correlated to the endpoint identifiers at the zero-trust service.

18. The computing system of claim 17, further comprising a policy service configured to store and evaluate policy, and wherein the zero-trust client is configured to identify the synthetic IP addresses as a result of endpoint identifiers meeting particular conditions of the policy.

19. The computing system of claim 17, wherein the computing system is coupled to a side channel, different from a channel used to send synthetic IP addresses and data traffic, wherein the side channel is configured for use in sending the endpoint identifiers to the zero-trust service.

20. The computing system of claim 17, wherein the computing system is coupled to an encrypted tunnel, the encrypted tunnel being used to send the synthetic IP addresses and the data traffic to the zero-trust service.

* * * * *